Nov. 23, 1965  E. L. SWAINSON  3,218,872
SELF-TESTING GYROSCOPE
Filed Sept. 26, 1961  2 Sheets-Sheet 1

INVENTOR.
EDWARD L. SWAINSON
BY Kenway, Jenney & Hildreth
ATTORNEYS

Nov. 23, 1965  E. L. SWAINSON  3,218,872
SELF-TESTING GYROSCOPE
Filed Sept. 26, 1961  2 Sheets-Sheet 2

INVENTOR.
EDWARD L. SWAINSON

United States Patent Office 3,218,872
Patented Nov. 23, 1965

3,218,872
SELF-TESTING GYROSCOPE
Edward L. Swainson, Newtonville, Mass., assignor to Northrop Corporation, Beverly Hills, Calif., a corporation of California
Filed Sept. 26, 1961, Ser. No. 140,730
9 Claims. (Cl. 74—5.6)

My invention relates to gyroscopes, and particularly to to an improved gyroscope incorporating apparatus for testing performance without dismounting the gyroscope or disconnecting it from the circuits with which it may be associated in a control or indication system.

Modern gyroscopes, as used in navigational aids and guidance systems, are highly complex and intricate structures subject to numerous minor malfunctions which may drastically impair their performance without any externally obvious deviation from normal operation. One parameter, which, if measured, could be used to indicate the presence or absence of such defects is the speed of rotation of the rotor. However, since the rotor is normally shielded by a series of casings which are interconnected by delicate bearings, it is difficult to measure the speed of the rotor without interfering with the operation of the gyroscope. For example, it has been proposed to measure rotor speed in terms of the frequency or magnitude of a voltage induced across an external coil by magnets mounted on the rotor. In air-spun gyroscopes of the type formerly employed, the external coil could be mounted adjacent the rotor and separated therefrom only by a small air gap. In the modern gyroscope, this cannot be done without removing the casings; if the casings are left in place, the eddy currents induced in them distort and greatly attenuate the signal.

In accordance with my invention, a great improvement in the level and information content of a signal induced by magnets mounted on the rotor of a gyroscope is attained by utilizing a magnetic circuit extending through the gimbal casings of the gyroscope to conduct flux from the rotor to an externally mounted coil.

Briefly, a rate gyroscope in accordance with one specific embodiment of my invention comprises a ferromagnetic spring connected between the inner casing, or gimbal, and the outer casing; a plurality of magnets disposed about the periphery of the rotor of the gyroscope; and a coil disposed about the ferromagnetic spring to develop a voltage having a magnitude and frequency depending on the number of the magnets and the speed of rotation of the rotor. A second embodiment of my invention, adapted for use in both rate and directional gyros, comprises a pivot having a ferromagnetic shaft connecting the inner casing to the outer casing, and a coil disposed about the ferromagnetic shaft to respond to flux induced by magnets mounted on the rotor.

Another parameter characteristic of the performance of a gyroscope is its damping rate. Also, in a rate gyroscope, the magnitude of the output signal generated in response to a given applied torque must be within prescribed limits if the gyroscope is to function properly in a system. In accordance with a specific aspect of my invention, I provide a torque generator comprising additional windings on the stator of the conventional output signal generator. By suitable energization of the torque generator, in a manner to be described, and observation of the signal generator output, both of these additional parameters may be measured without interrupting the normal circuit connections of the gyroscope.

The structure and mode of operation of the improved gyroscope of my invention will best be understood by reference to the accompanying drawings, together with the following detailed description, of a preferred embodiment of my invention.

Figure 1:
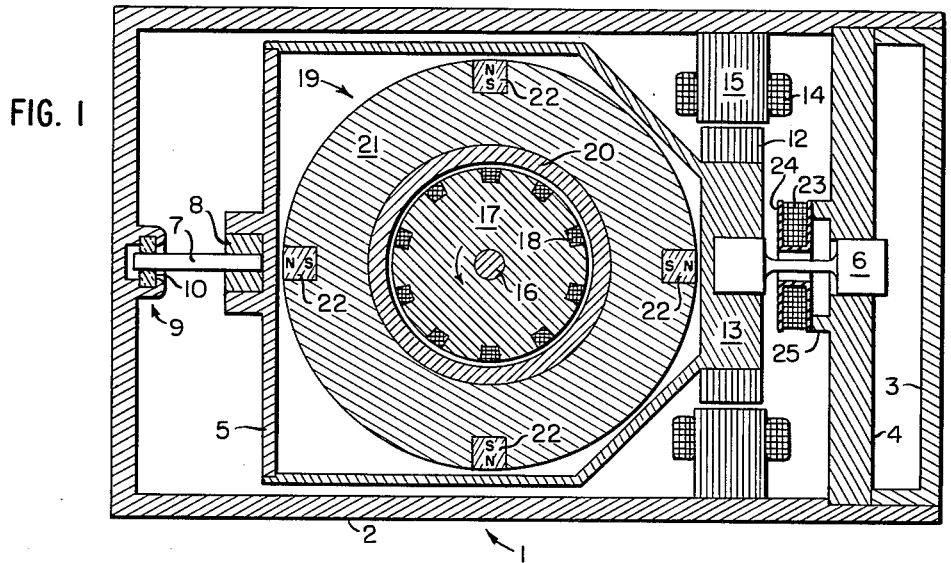
FIGURE 1 is an elevational view, partly in cross section, of a rate gyroscope embodying my invention.

Referring now to FIGURE 1, I have shown a gyroscope having an outer casing 1 comprising a cylindrical container 2 closed at one end and having its other end closed by an end cap 3 secured thereto. A support member 4 is attached to the container 2 inside the end cap 3 for purposes to be described. An inner casing, or gimbal 5, is disposed within the outer casing with a clearance which has been greatly exaggerated in the drawing for purposes of illustration. The gimbal 5 is mounted in the outer casing for limited rotation, by means comprising a spring, here shown as a torsion bar 6 secured between the inner casing and the support member 4, as schematically indicated in FIG. 1, at one end, and a jewel bearing schematically indicated as comprising a pivot 7 attached to a hub 8 mounted in the end wall of the gimbal 5 and a jewel support 9 provided with jewels 10 attached to the end wall of the outer casing 1.

In order to test the gimbal freedom, response, and damping of the gyroscope, I provide means for applying controlled torques to the gimbal 5. While a separate torque generator could be provided for this purpose without departing from the scope of my invention, I prefer to add torquing windings to the stator of the conventional signal generator employed to sense the angular deflection of the rotor 5 about its output axis. As shown, this signal generator comprises a ferromagnetic rotor 12 attached to a cylindrical hub portion 13 formed at one end of the gimbal 5. The rotor 12 may be notched about its periphery to form a series of teeth which cooperate with windings 14 wound on a ferromagnetic stator 15, in a manner to be described in detail below.

As shown in FIG. 1, the gyroscope includes a shaft 16 mounted transversely in the gimbal 5 and having affixed thereto a stator 17 carrying windings 18. A rotor generally designated as 19 is rotatably mounted on the shaft 16 in a conventional manner, not shown, and comprises a ferromagnetic hysteresis ring 20 and an inertial mass 21 of non-ferromagnetic material affixed to the ferromagnetic ring 20. The rotor 19 is rotated in a conventional manner by energization of windings 18 to rotate ferromagnetic ring 20.

A plurality of magnets 22 are disposed in the periphery of the rotor 19 as shown, the magnets being oriented with like poles directed toward the center of the rotor. The number of magnets is not critical, but can be chosen in practice either for manufacturing convenience or to give a convenient output frequency at the normal speed of the rotor, in a manner that will become apparent as the description proceeds.

The space between the gimbal 5 and the outer casing 1 may be filled with a suitable damping fluid, not shown, in the manner conventional in the art. Alternatively, magnetic damping, air damping, or other conventional damping means may be employed.

In accordance with my invention, the torsion bar 6 is made of a material which is significantly ferromagnetic, while having suitable properties for performance as a spring. Since these requirements are inherently conflicting, it may be desirable in some instances to make the torsion bar rather longer and thinner than is usual, so that an iron or steel of relatively good magnetic properties can be employed.

A sensing coil 23 is wound on a suitable bobbin 24 surrounding the torsion bar 6 intermediate its ends, as shown in FIG. 1. The bobbin 24 may be secured to a suitable lug 25 formed on the support member 4. The coil 23 preferably consists of a relatively large number of turns of fine wire. As shown in FIG. 1, the coil 23 is preferably disposed loosely on the torsion bar 6 to permit flexure of the torsion bar. However, if desired, this coil may be fixed to the torsion bar, and if so it should be made thin relative to the length of the reduced portion of the torsion bar, and provided with flex leads for external connections. Either construction affords markedly superior coupling to that available with prior constructions.

The terminals of coil 23 may be brought out through the outer casing 1, in a conventional manner not shown, and connected to a suitable measuring device, to be described in connection with FIG. 3.

Figure 2:
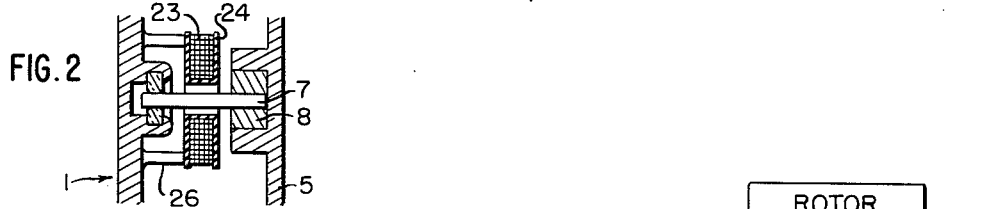
FIGURE 2 is a fragmentary elevational view of a gyroscope similar to that shown in FIG. 1, but showing a modified arrangement of the parts by which my invention can be embodied in either a rate or a displacement gyroscope.

An alternate construction, which can be employed in either rate or directional gyroscopes, is shown in FIGURE 2. In FIG. 2, parts corresponding to those shown in FIG. 1 have been given corresponding reference characters. As there shown, the sensing coil 23 is disposed about the shaft of pivot 7 and held in place by a suitable bobbin 24 attached to a lug 26 secured to the end wall of the outer casing 1.

The pivot shaft 7 may be made of any desired ferromagnetic material of high magnetic efficiency, and if desired, the tip may be heat treated, or made of a different material, to better serve as a bearing. As is conventional, the pivot 7 may be mounted in a steel hub 8 let into the end wall of the gimbal 5, as shown.

In the operation of the modifications shown in FIGS. 1 and 2, the voltage induced in coil 23 by the action of rotating magnets 22, and conducted through the ferromagnetic paths provided by torsion bar 6 in FIG. 1 and pivot 7 in FIG. 2, will be proportional in frequency to the number of magnets and the speed of rotor 19 and will be proportional in magnitude to the speed of the rotor. Thus, either a voltmeter or a suitable frequency meter may be employed to indicated directly the speed of the rotor. Since the flux variations produced by the motion of magnets 15 are directly coupled to the sensing coil through an efficient magnetic path, it will be apparent that the speed responsive signal developed in the sensing coil will be at a higher level, and of a more regular waveform, than in prior constructions.

Figure 3:
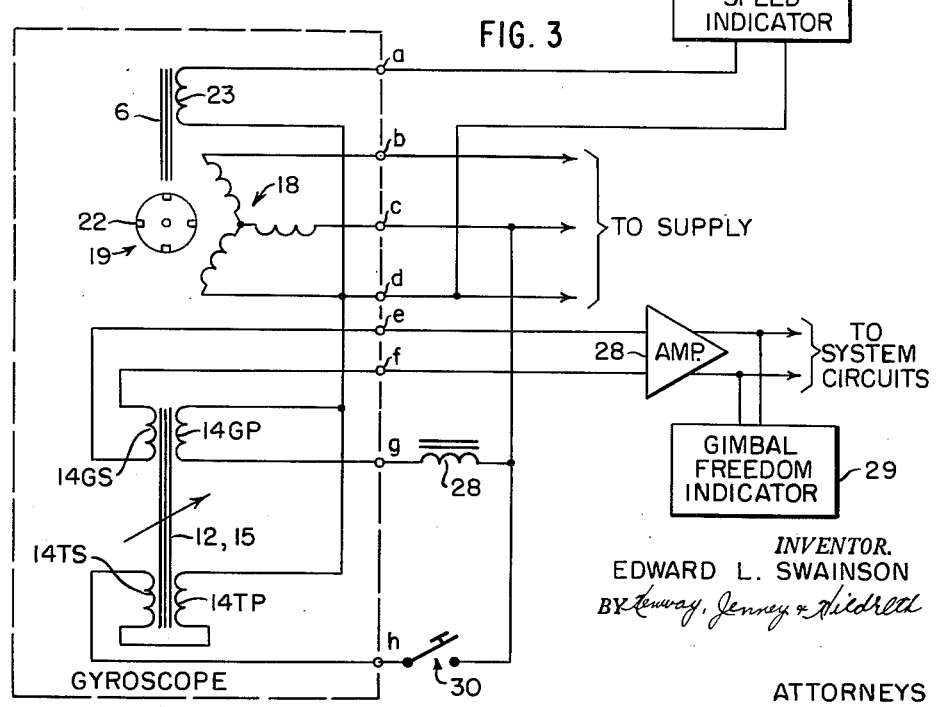
FIGURE 3 is a schematic wiring diagram showing the manner in which the elements of the gyroscope of FIG. 1 may be electrically interconnected to form a self testing gyroscope.

Referring now to FIGURE 3, I have shown a wiring diagram illustrating the manner in which the elements of FIGURE 1 may be interconnected to form a self testing gyroscope. In FIG. 3, the elements of the gyroscope of FIGS. 1 and 2 are shown within a dotted line, the rest of the circuits shown being external to the gyroscope. The lettered terminals shown on the dotted line correspond to the external terminals of the gyroscope.

In a conventional manner, the drive windings 18 for the rotor 19 are connected to external terminals b, c and d of the gyroscope, these terminals being connected to a suitable 2, 3, or split phase alternating voltage supply. The signal generator portion of the windings 14 of the combined signal generator and torquer comprises a primary winding 14GP which is connected at one end to supply terminal d and at the other end, through terminal g and a suitable current limiting choke 28, to supply terminal c. A secondary winding 14GS of the signal generator is connected to external terminals e and f, and thence to a conventional signal amplifier 28. Amplifier 28 has its output connected in parallel to system circuits, of any conventional system in which the gyroscope may be connected, and to a gimbal freedom indicator 29, which may be a conventional phase sensitive voltmeter or the like.

The torque generator portion of the windings 14 comprises a first group of windings generally designated as 14TP and a second group of windings generally designated as 14TS. As shown, one terminal of windings 14TP is connected to supply terminal d, windings 14TP and 14TS are connected in series, and the free terminal of windings 14TS is connected to a terminal h on the gyroscope, and thence through a normally open manually operated switch 30 to supply terminal c. As will appear, when switch 30 is closed, a predetermined torque will be applied to the rotor 12 to cause the gimbal 5 in FIG. 1 to rotate against the restraint imposed by the torsion bar 6. In response to this rotation, the secondary winding 14GS of the signal generator will supply a signal to amplifier 28 and thence to gimbal freedom indicator 29, the response of which will determine whether or not the gimbal is free and in calibration. At the same time, the dynamic behavior of the gimbal freedom indicator may be used to indicate the damping of the gimbal 5.

The coil 23 is excited by magnets 22 mounted in the rotor 19 through the magnetic coupling provided by the torsion bar 6, as schematically indicated in FIG. 3. As shown, one terminal of the coil 23 is connected to supply terminal d which serves as a reference ground, and the other terminal is connected over terminal a of the gyroscope to one input terminal of a rotor speed indicator 31. As noted above, the indicator 31 may be either a high impedance voltmeter or a conventional frequency meter, since both the frequency and the magnitude of the voltage induced across coil 23 are determined by the speed of the rotor 19.

Figure 4:
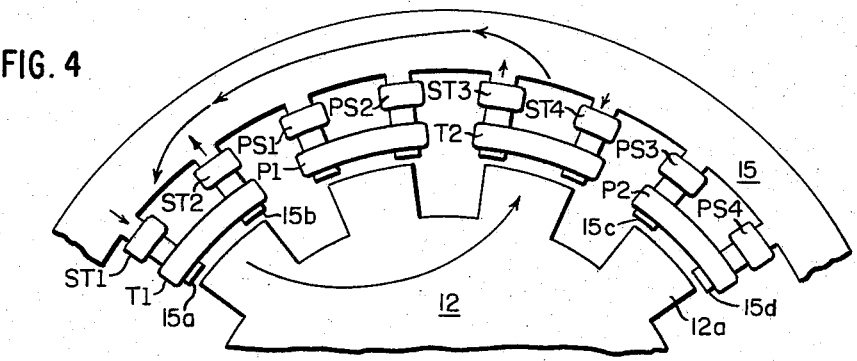
FIGURE 4 is a fragmentary end view of a combined torque and signal generator that may be employed in the gyroscope of my invention.
Figure 5:
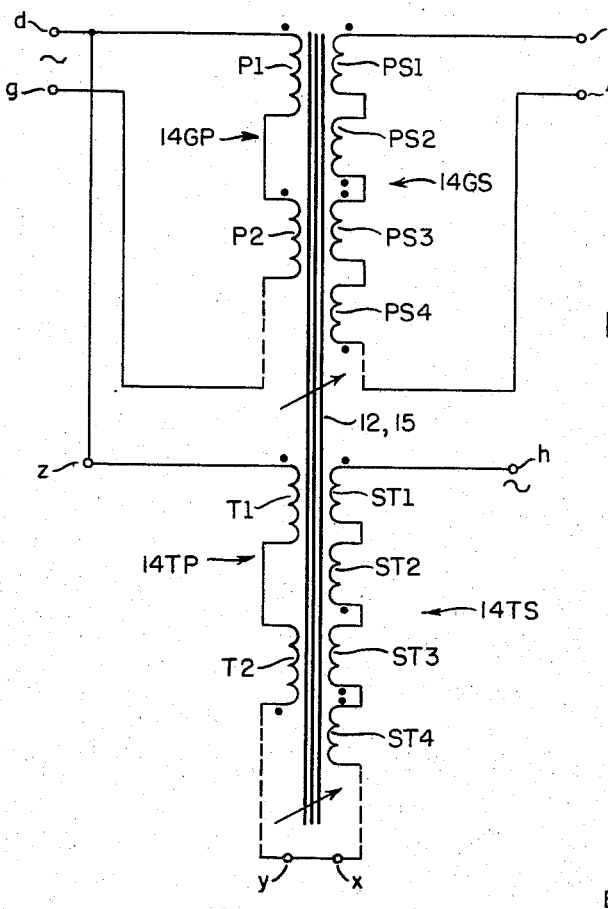
FIGURE 5 is a schematic wiring diagram of the apparatus of FIG. 4.

One manner in which the rotor 12 and stator 15 may be constructed and wound is illustrated in FIGURES 4 and 5. As there shown, the stator 15 may be provided with a series of pairs of pole pieces. Alternate pairs of pole pieces, including the pair designated as 15a and 15b, are wound to form a torque generator, and the remaining pairs, including the pair designated as 15c and 15d, are wound to form a signal generator, as will appear.

The torque generator is formed by a primary winding 14TP which is divided into a series of primary windings T1, T2, etc., shown in FIGS. 4 and 5, which are wound on alternate pairs of pole pieces such as 15a and 15b of the stator 15, and a secondary winding 14TS comprising a series of coils ST1, ST2, etc., each wound on one of the pole pieces of alternate pairs. These windings are interconnected as shown in FIG. 5, with relative polarities indicated by dots in a conventional manner. When energized by an alternating voltage applied between terminals d and h in FIGURE 5, during a given half cycle flux produced by adjacent primary windings such as T1 and T2 flows in a path including the teeth of the rotor 12 as indicated by the curved arrow. Flux is produced by the secondary windings ST1, ST2, etc., in a sense indicated by the short arrows above the windings. If the teeth of the rotor 12 are symmetrically positioned with respect to a given pair of pole pieces, one pole piece carries a greater flux than its neightbor, and a torque is produced which tends to rotate the rotor 12 to a position in which there is a smaller effective air gap between the rotor tooth and the pole piece carrying the larger flux. An opposite torque may be produced by reversing the connections of either the primary winding 14TP or of the secondary winding 14TS. If desired, these windings may be excited by a D.C. voltage instead of an A.C. voltage.

The signal generator is formed by a primary winding 14GP, comprising a series of windings P1, P2, etc., wound on alternate pairs of pole pieces including the pair 15c and 15d of the stator 15, and a secondary winding 14GS, comprising a series of windings PS1, PS2, etc., each wound on one pole piece of each pair having a primary winding of the signal generator. The windings are wound and interconnected as indicated in FIG. 5. When the primary winding 14GP is excited with an alternating voltage, and the teeth 12a of the rotor 12 are symmetrically positioned with respect to the pole pieces of the stator 15, no output voltage is generated. However, when the rotor is displaced angularly from a symmetrical position, one secondary winding of each pair is linked by a greater flux than the other, because of a smaller effective air gap, and a voltage having a magnitude in accordance with the angular displacement of the rotor 12 and a phase of one or an opposite sense depending on the sense of the displacement appears across the output terminals of the secondary winding 14GS.

The particular construction of the combined torquer and signal generator described above does not form a part of my invention, but is disclosed and claimed in U.S. application Serial No. 134,768, filed August 29, 1961 by Henry G. Packard, for Combined Pick-Off and Torquer and assigned to the assignee of my application.

When connected as indicated in FIGURE 5, energization of the torque generator windings 14TP and 14TS will produce a torque in only one sense. If desired, individual terminals may be provided for the windings so that other modes of energization may be employed. Thus, if the lead between terminal z and terminal d, and the lead between terminal x and terminal y, are omitted, and the terminals z, x and y brought out of the gyroscope outer casing 1, connections may be made to either D.C. or A.C. sources to provide torques of opposite senses or to apply a step function to the coils, whereby the response of the gyroscope may be more fully investigated.

The operation of the apparatus of FIG. 3 will be apparent from the above description. Briefly, with the gyroscope operating and installed in a guidance system, for example, with the system at rest, the gimbal freedom indicator 29 should be in a null position and the rotor speed indicator 31 should indicate the full design speed of the rotor. If switch 30 is momentarily closed, a torque will be produced on the gimbal 5 to rotate the gimbal at a rate depending on the applied torque and the gimbal damping, which can be observed on the gimbal freedom indicator 29. If switch 30 is closed for a longer time, the gimbal freedom indicator should reach an equilibrium value in accordance with the applied torque.

It will be apparent that the tests described above may be made without disconnecting the gyroscope from the system in which it is connected; however, if a transient system response to the gyroscope gimbal freedom tests is not desired, one of the output leads from amplifier 28 to the system may be temporarily disconnected. The gimbal freedom indicator 29 and the rotor speed indicator 31 may be either permanently installed in the system, or temporarily connected to the appropriate terminals and then removed, as desired.

While I have described my invention with specific reference to various structural details, it will be apparent to those skilled in the art after reading my description that various changes and modifications can be made, and such are obviously within the spirit and scope of my invention.

Having thus described my invention, what I claim is:

1. In a gyroscope having a rotor disposed within a gimbal, for rotation about a first axis, said gimbal being secured within an outer casing for limited angular rotation about a second axis normal to said first axis by a bearing at one end and a restraining spring of ferromagnetic material at an opposite end, a coil wound about said restraining spring and secured to said casing, and a plurality of magnets disposed about the periphery of said rotor for rotation therewith to induce an alternating voltage in said coil having a frequency and magnitude corresponding to the speed of rotation of the rotor.

2. In a gyroscope having a rotor disposed within a gimbal for rotation about a first axis, an outer casing surrounding said rotor, means mounting said gimbal within said outer casing, for limited angular rotation about a second axis normal to said first axis, said mounting means comprising ferromagnetic means connecting said gimbal to said outer casing, a coil disposed about said ferromagnetic means and secured to said casing, and a plurality of magnets disposed about the pheriphery of said rotor for rotation therewith in a plane intersecting said ferromagnetic means to induce a varying flux therein and thereby induce a varying voltage across said coil.

3. A gyroscope comprising an outer casing, a cylindrical gimbal disposed within said outer casing, mounting means securing said gimbal to said casing for limited and restrained rotation with respect to the casing about a first axis, a rotor rotatably mounted within said gimbal, means for rotating said rotor about a second axis normal to said first axis, a plurality of magnets mounted on said rotor, said magnets being positioned to describe a predetermined path upon rotation of said rotor, said mounting means comprising a ferromagnetic element connected between said outer casing and said gimbal at a point adjacent said path, whereby flux changes are induced in said element by said magnets upon rotation of said rotor and a sensing coil disposed about said ferromagnetic element and secured to said casing and responsive to said flux changes to produce a varying output voltage.

4. In a rate gyroscope having a rotor mounted within a gimbal for rotation about a first axis, a plurality of magnets mounted on said rotor in position to describe a circle about said axis upon rotation of said rotor, an outer casing surrounding said gimbal, means for mounting said gimbal in said outer casing for limited rotation about an axis normal to said first axis, said means comprising a bearing at one end of said gimbal and a torsion bar of ferromagnetic material at an opposite end of said gimbal, said torsion bar being located adjacent a point on said circle, and a sensing coil disposed about said torsion bar and secured to said casing.

5. A self testing gyroscope, comprising, in combination, a rotor comprising an inner ferromagnetic hysteresis ring and an outer inertial mass of non-ferromagnetic material, a plurality of magnets located in the periphery of said inertial mass for rotation therewith in a predetermined path, a stator disposed within said rotor and including electrical means for rotating said rotor, a cylindrical casing surrounding said stator and rotor, a shaft secured transversely in said casing and affixed to said stator, said rotor being rotatably mounted on said shaft for rotation about a first axis, an outer casing, means rotatably securing said inner casing to said outer casing for rotation about an axis normal to said first axis, said means comprising a ferromagnetic element located adjacent said path and responsive to rotation of said magnets to produce a varying flux field, a coil disposed about said ferromagnetic element and secured to said outer casing, said coil responding to said field to produce a varying output voltage, and an electrical measuring device connected to said coil to indicate the speed of rotation of said rotor.

6. A self testing gyroscope, comprising, in combination, a rotor comprising an inner ferromagnetic hysteresis ring and an outer inertial mass of non-ferromagnetic material, a plurality of magnets located in the periphery of said inertial mass for rotation therewith in a predetermined path, a stator disposed within said rotor and including electrical means for rotating said rotor, a cylindrical casing surrounding said stator and rotor, a shaft secured transversely in said casing and affixed to said stator, said rotor being rotatably mounted on said shaft for rotation about a first axis, an outer casing, means comprising a ferromagnetic shaft rotatably securing said inner casing to said outer casing for rotation about an axis normal to said first axis, said shaft being located adjacent said path, and a coil secured to said outer casing and disposed about said shaft.

7. A self testing gyroscope, comprising, a rotor disposed within a gimbal for rotation about a first axis, said gimbal being secured within an outer casing for limited angular rotation about an axis normal to said first axis by a bearing at one end and a restraining spring of ferromagnetic material at an opposite end, rotation means mounted in said gimbal for rotating said motor, a coil wound about said restraining spring and secured to said casing, a plurality of magnets disposed about the periphery of said rotor for rotation therewith in a plane intersecting said spring to induce a varying flux therein and thereby induce a varying voltage across said coil, means for measuring the angular deflection of the gimbal with respect to the outer casing, and means for applying a predetermined torque to the gimbal to deflect it angularly with respect to the casing against the restraint imposed by said spring.

8. A self testing gyroscope, comprising, a rotor disposed within a gimbal, said gimbal being disposed within an outer casing, rotation means mounted on said gimbal for rotating said rotor, ferromagnetic means for connecting said gimbal to said outer casing, a coil disposed about said ferromagnetic means and secured to said casing, a plurality of magnets disposed about the periphery of said rotor in an array producing flux pulses in said ferromagnetic means during rotation of said rotor, means resiliently restraining the gimbal against rotation with respect to said casing, means for indicating the angular deflection of said gimbal from a null position with respect to said casing, and means for applying a predetermined torque to said gimbal to deflect it from the null position.

9. Apparatus for testing the performance of a gyroscope having a rotor disposed within a gimbal, said gimbal being mounted within an outer casing for restrained angular movement with respect to the casing by means comprising a ferromagnetic element, said apparatus comprising, magnetic means mounted on said rotor for inducing flux pulses in said ferromagnetic element at a rate determined by the speed of rotation of the rotor, means electromagnetically coupled to said ferromagnetic element and responsive to said flux pulses for indicating the speed of the rotor, means responsive to the angular position of said gimbal in said casing for generating a signal in accordance therewith, means controlled by said signal for indicating the angular position of said gimbal, and means for applying a predetermined torque to said gimbal.

References Cited by the Examiner
UNITED STATES PATENTS

| | | | |
|---|---|---|---|
| 2,559,849 | 7/1951 | Covert | 324—70 |
| 2,707,401 | 5/1955 | McNatt | 74—5.6 |
| 2,753,718 | 7/1956 | Howe | 74—5.6 |
| 2,982,139 | 5/1961 | Bennett | 74—5.6 X |

BROUGHTON G. DURHAM, *Primary Examiner.*

MILTON KAUFMAN, *Examiner.*